May 8, 1951

W. W. MAHER 2,551,616

APPARATUS FOR FEEDING CAN BODIES
TO ISOLATED WIPING STATIONS

Filed Dec. 2, 1947

INVENTOR
William W. Maher
BY
Ivan D. Thornburgh
Charles H. Bune
ATTORNEYS

May 8, 1951

W. W. MAHER 2,551,616

APPARATUS FOR FEEDING CAN BODIES
TO ISOLATED WIPING STATIONS

Filed Dec. 2, 1947

INVENTOR
William W. Maher
BY Ivan D. Thornburgh
Charles H. Erne
ATTORNEYS

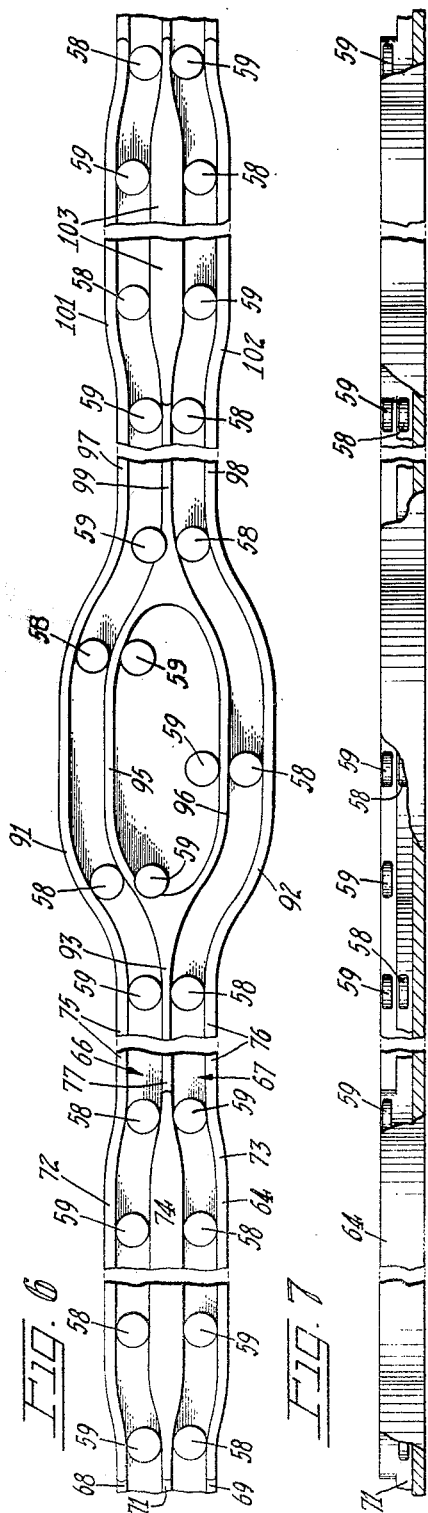
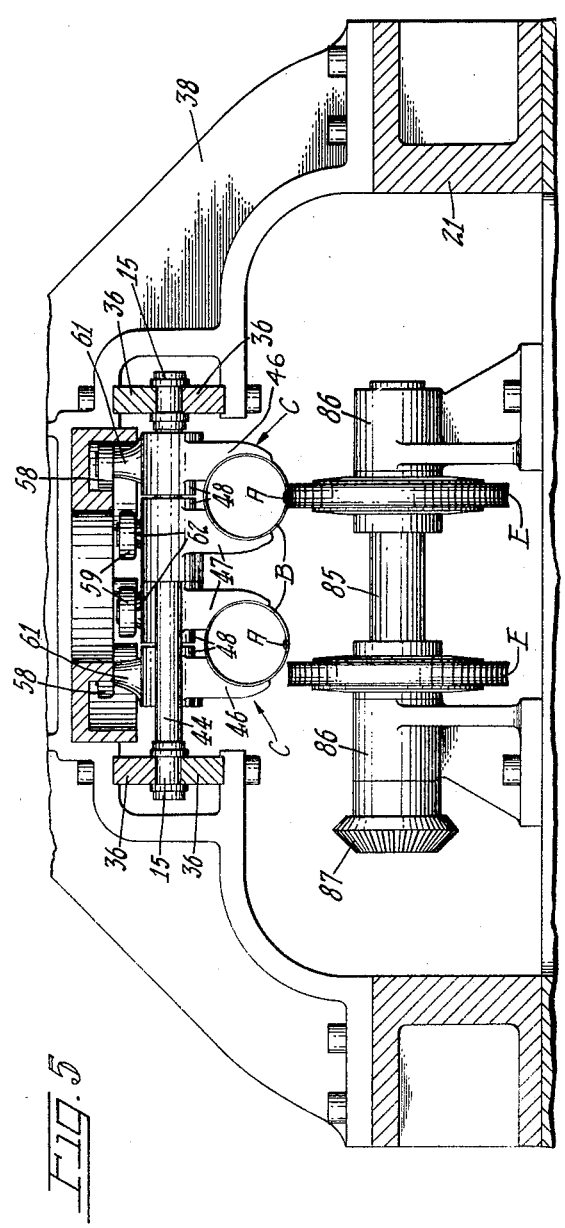

Patented May 8, 1951

2,551,616

UNITED STATES PATENT OFFICE 2,551,616

APPARATUS FOR FEEDING CAN BODIES TO ISOLATED WIPING STATIONS

William W. Maher, San Francisco, Calif., assignor to American Can Company, New York, N. Y., a corporation of New Jersey Application December 2, 1947, Serial No. 789,288

4 Claims. (Cl. 113—97)

The present invention relates to a method of and apparatus for treating containers or cans or can bodies or other articles moving in a continuous procession along a path of travel and has particular reference to diverting such containers or other articles from the procession for separate and spaced treatment.

An object of the invention is the provision of a method of and apparatus for treating containers moving in spaced and timed order in a continuous procession wherein individual containers are diverted or shifted out of the moving procession into a position separated and spaced therefrom for separate treatment without interference with the movement of the procession of containers or with the other containers in the procession, the treated containers being returned to the procession for further advancement therewith.

Another object is the provision of such a method of and apparatus for treating containers wherein the containers may be diverted in a staggered relation, alternate containers being shifted in one direction free of the procession while the in-between containers are shifted in another direction so that separate treatment of the separated containers may be effected in a rapid and efficient manner without interference.

Numerous other objects and advantages of the invention will be apparent as it is better understood from the following description, which, taken in connection with the accompanying drawings, discloses a preferred embodiment thereof.

Referring to the drawings:

Figures 1 and 2 taken together constitute a side elevation of a container treating machine embodying the instant invention and utilized for carrying out the steps of the invention with parts broken away and parts shown in section;

Fig. 5 is an enlarged transverse sectional view taken substantially along the line 5—5 in Fig. 2, with parts broken away;

Fig. 6 is a schematic bottom plan view of a cam portion of the machine, with parts broken away, the view being drawn on a reduced scale; and Fig. 7 is an inverted side elevation of the cam portion of the machine shown in Fig. 6, with parts broken away.

Figure 1:
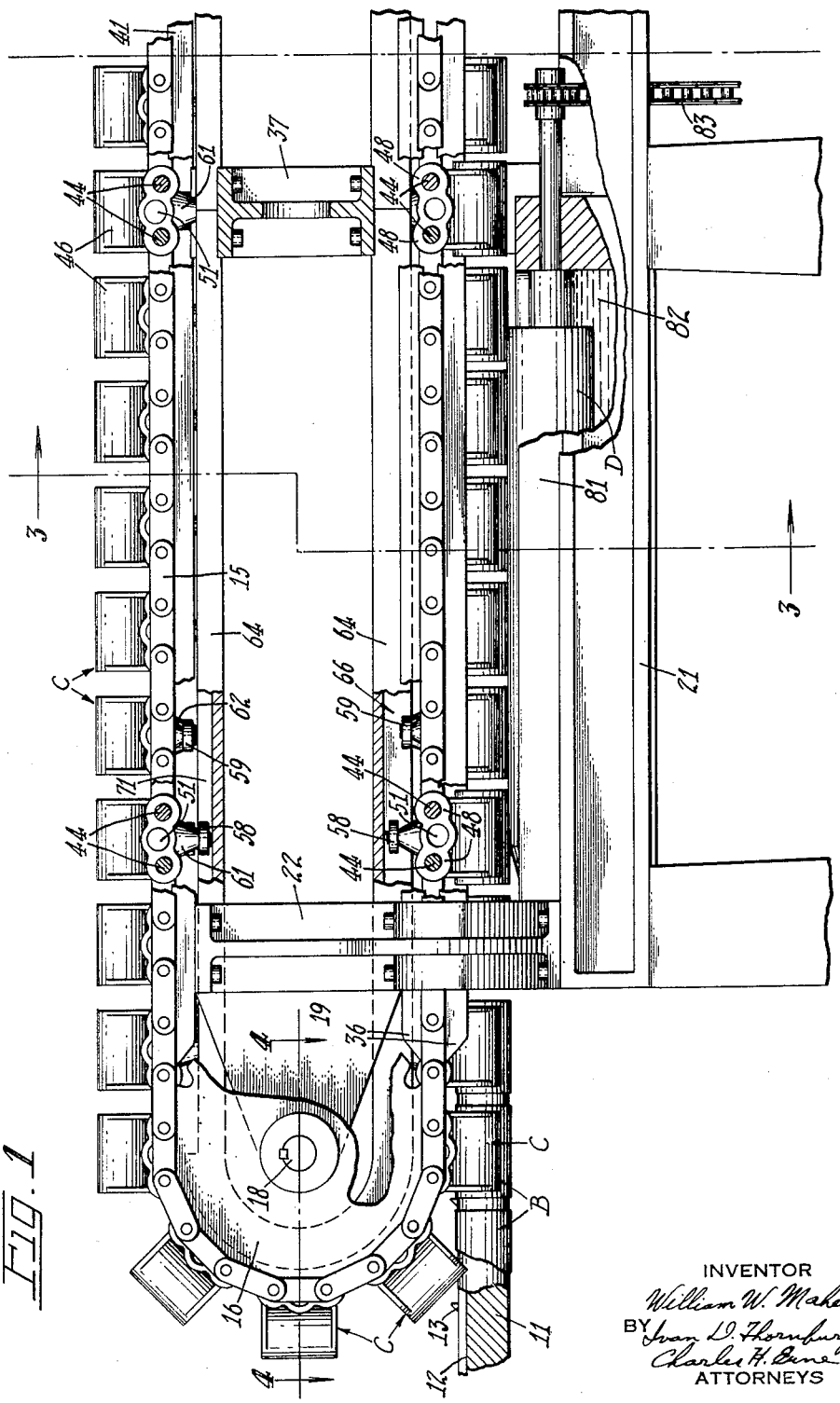

As a preferred embodiment of the instant invention the drawings illustrate a method of and principal parts of a machine for soldering and wiping the side seams A (Fig. 3) of sheet metal, tubular can bodies B entering the machine in timed and spaced order and in a continuous straight line procession. In the machine each can body B as it enters, is gripped by a continuously moving gripper head C (Fig. 1) which carries the body in a suspended relation over a solder roll D for applying molten solder to the body side seam A.

Following the seam soldering operation, any excess solder is wiped off the seams to provide a smooth clean seam. This is effected by passing each body individually into engagement with a rapidly rotating wiper wheel E of the usual construction. In order to prevent throwing of solder pellets or other foreign matter from the wiper wheel into the interior of the passing can bodies, the wheel is located out of or to one side of the straight line path of travel of the bodies and each body as it comes adjacent the wiping station is diverted or shifted laterally out of its straight line path of travel and into a path of travel in alignment with the wiper wheel, while still moving forward in timed and spaced relation to the other bodies in the procession.

In order to provide for rapid treatment of the bodies B, two wiper wheels E are provided and located one on each side of the straight line path of travel of the incoming procession of bodies and alternate bodies in the procession are shifted in one direction for treatment by one of the wiper wheels while the in-between bodies are shifted in an opposite direction for treatment by the other of the wheels. Thus the bodies are separated and spaced in staggered relation for separate treatment. When thus staggered a body receiving a wiping treatment is completely separated and spaced away or isolated from any other body and thus any solder pellets which may be thrown off by the wiper wheel from one can body cannot touch or be deposited in another can body. In this manner the interiors of the can bodies are protected against contamination by solder pellets, flux or other particles of foreign matter.

Following this seam wiping operation, the treated can bodies are returned or shifted back into the original straight line path of travel of the bodies to form a continuing outgoing procession of bodies and are released from the gripper head C for further advancement in this procession. This completes the cycle of operation of the machine and the method steps of the invention.

In the machine disclosed in the drawings for carrying out the method steps, the can bodies B with their side seams A located along the bottom of the bodies in the position they are received from a can bodymaker, enter the machine on a stationary mandrel or horn 11 (Fig. 1) which may be a part of the bodymaker such as disclosed in United States Patent 1,770,041 issued July 8, 1930, to J. F. Peters. The can bodies are advanced along this entrance horn in spaced and timed order by a reciprocating stroke feed bar 12 having spaced spring held feed dogs 13 for engagement behind the bodies. The feed bar may be reciprocated in any suitable manner through a forward or advancing stroke and thence through a return stroke.

Upon a forward stroke of the feed bar 12 a can body B is advanced by a feed dog 13 into a position for engagement and further advancement by a gripper head C. There are a plurality of these gripper heads C carried on and moving with a pair of spaced and parallel endless chain conveyors 15 (Figs. 1 and 2) disposed above the horn 11 and extending for the full length of the machine. The conveyors operate over pairs of spaced sprockets, constituting a pair of idler sprockets 16 located adjacent the entrance end of the machine (at the left as viewed in Fig. 1) and a pair of driving sprockets 17 located adjacent the discharge end of the machine (at the right as viewed in Fig. 2).

Figure 4:
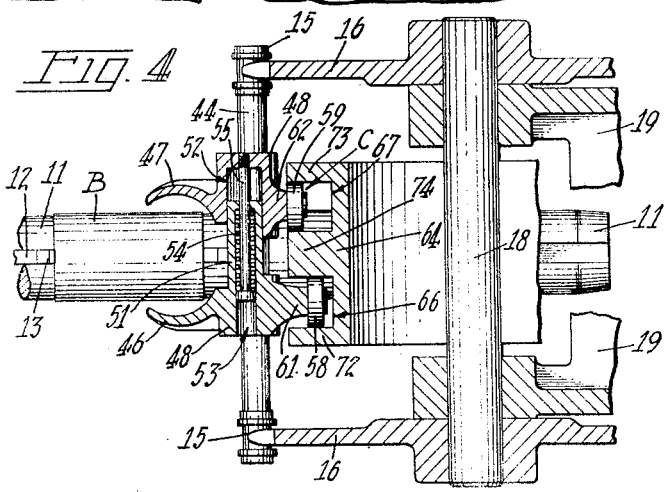

The idler sprockets 16 are mounted on an idler shaft 18 (see Figs. 1 and 4) journaled in a pair of spaced bearing brackets 19 formed on an upright portion 22 of a frame 21 which constitutes the main frame of the machine. The driving sprockets 17 are mounted on a driving shaft 23 (Fig. 2) journaled in a pair of bearing brackets 24 which extend out from an upright portion 25 of the machine frame. The driving shaft is continuously rotated by a sprocket 27 which is mounted on the outer end of the shaft 23 and which in turn is rotated by an endless drive chain 28. The chain is operated by a drive sprocket 29 mounted on a main drive shaft 31 journaled in bearing brackets 32 secured to an extension 33 of the machine frame 21. The main drive shaft 31 is rotated in any suitable manner.

Between the idler sprockets 16 and the driving sprockets 17, the chain conveyors 15 are supported against sagging. For this purpose, the links of the conveyors along their lower runs, ride between pairs of upper and lower guide rails 36 (Figs. 1, 2, 3 and 5) which extend the full length of the machine and which are secured to the upright portions 22, 25 of the frame 21 and to similar intervening upright portions 37, 38. Along the upper runs of the conveyors 15, their links ride on single rails 41 which are secured to the upright portions 22, 25, 37, 38 of the frame.

The gripper heads C are disposed between the two chain conveyors 15 and are carried on pairs of spaced and parallel transverse slide rods 44 (Figs. 1 and 3) which extend across the space between the conveyors. The ends of the rods are secured to the links of the conveyors. There are two rods 44 for each head C and the heads are spaced in the same relation as the spacing of the can bodies as they enter the machine in a straight line procession as mentioned above.

Figure 3:
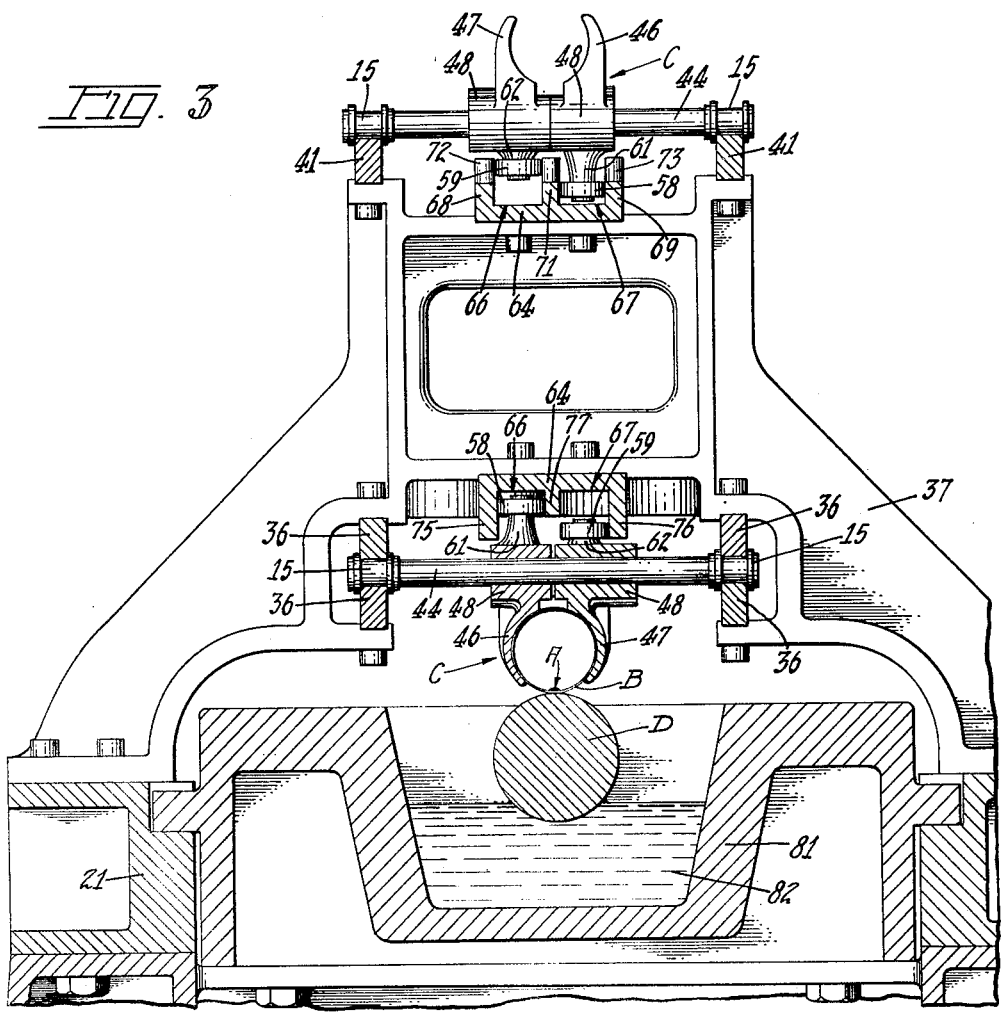
Figs. 3 and 4 are enlarged transverse sectional views taken substantially along the lines 3—3, 4—4, in Fig. 1, with parts broken away.

Each gripper head C comprises a pair of semi-cylindrical half-mould gripper jaws 46, 47 which together are adapted to encircle a can body and hold it firmly against rotation therebetween while leaving its side seam A exposed for the soldering and wiping operation as best shown in Fig. 3. Each of these jaws 46, 47 is formed with a pair of spaced and parallel slide bearings 48 (see also Fig. 1) which surrounds the two slide rods 44 associated with each head.

The two jaws 46, 47 of each head C are yieldably tied together. For this purpose each jaw 46 is formed with an integral spring barrel 51 (Figs. 1 and 4) which is located between its slide bearings 48 and which extends into a recess 52 formed in the oppositely disposed jaw 47. The spring barrel 51 is formed with a blind bore 53 which houses a compression spring 54. The spring surrounds a long bolt 55 which extends through the bottom of the spring barrel and is threadedly engaged in the jaw 47. The spring is interposed between the bottom of the barrel and a head formed on the bolt and thus tends to draw the two jaws 46, 47 together for gripping action against the can body.

The two head jaws 46, 47 of each head C are movable relative to each other against the pressure of their spring 54 for spreading them apart to engage over a can body B. They are also movable as a unitary structure for shifting the can body laterally as will be more fully explained hereinafter. These movements of the jaws are brought about by a pair of cam rollers constituting a head control or shifting roller 58 and a jaw control or spreading roller 59 which are carried on the jaws. The roller or cam follower 58 is mounted on a relatively long stem 61 formed on the jaw 46 while the roller or cam follower 59 is mounted on a relatively short stem 62 formed on the jaw 47. The two cam rollers or followers of each head C are thus disposed at different levels or planes.

There is one set of cam rollers 58, 59 for each gripper head C, and both rollers operate in a stationary continuous cam 64 which is disposed adjacent and extends completely around the path of travel of the cam rollers as they move with their heads on the conveyors 15. The cam is secured to the upright portions 22, 25, 37, 38 of the machine frame. The cam is formed with two identical but oppositely formed, adjacent tracks 66, 67 (see Fig. 6) which are defined by outer side walls 68, 69 and an inner separating wall 71. Portions of these walls are deep enough to accommodate the head shifting rollers 58 as well as the jaw spreading rollers 59 while other portions are shallow so that only the rollers 58 will engage them as will be further explained hereinafter.

The gripper heads C are arranged on the conveyors 15 with alternate heads having their gripping jaws and cam rollers disposed in a reversed relation to the in-between heads as best shown in Fig. 3 for staggering the heads for the wiping operation as will be explained hereinafter. In this reversed order the cam rollers 58 of the alternate heads operate in the cam track 66 of the cam 64 and the cam rollers 59 operate in the track 67. On the in-between heads, the rollers 58 operate in the track 67 while the rollers 59 operate in the track 66 (just the reverse of the alternate heads).

Along the upper run of the conveyors 15, the two cam tracks 66, 67 are parallel and closely adjacent each other as shown in Fig. 3 and at the extreme left in Fig. 6. In this upper portion of the cam, which extends for nearly the whole length of the machine, the outer side walls 68, 69 and the inner separating wall 71 are shallow so that only the head shifting rollers 58 operate in the cam tracks. The jaw spreading rollers 59 extend above the tracks and are free and clear of the tracks and thus permit the compression spring 54 in the heads C to maintain the head jaws 46, 47 in closed position as shown in the upper portion of Fig. 3.

In the portion of the cam 64 that curves downwardly adjacent the idler sprockets 16 (see Fig. 1), the side walls 68, 69 curve outwardly as viewed in Fig. 6 and merge into continuing side walls 72, 73 which are spread farther apart than the walls 68, 69 and which are higher than these walls so that the cam rollers 59 as well as the rollers 58 engage against them. The inner separating wall 71 merges into a correspondingly thicker and higher separating wall 74.

Figure 2:
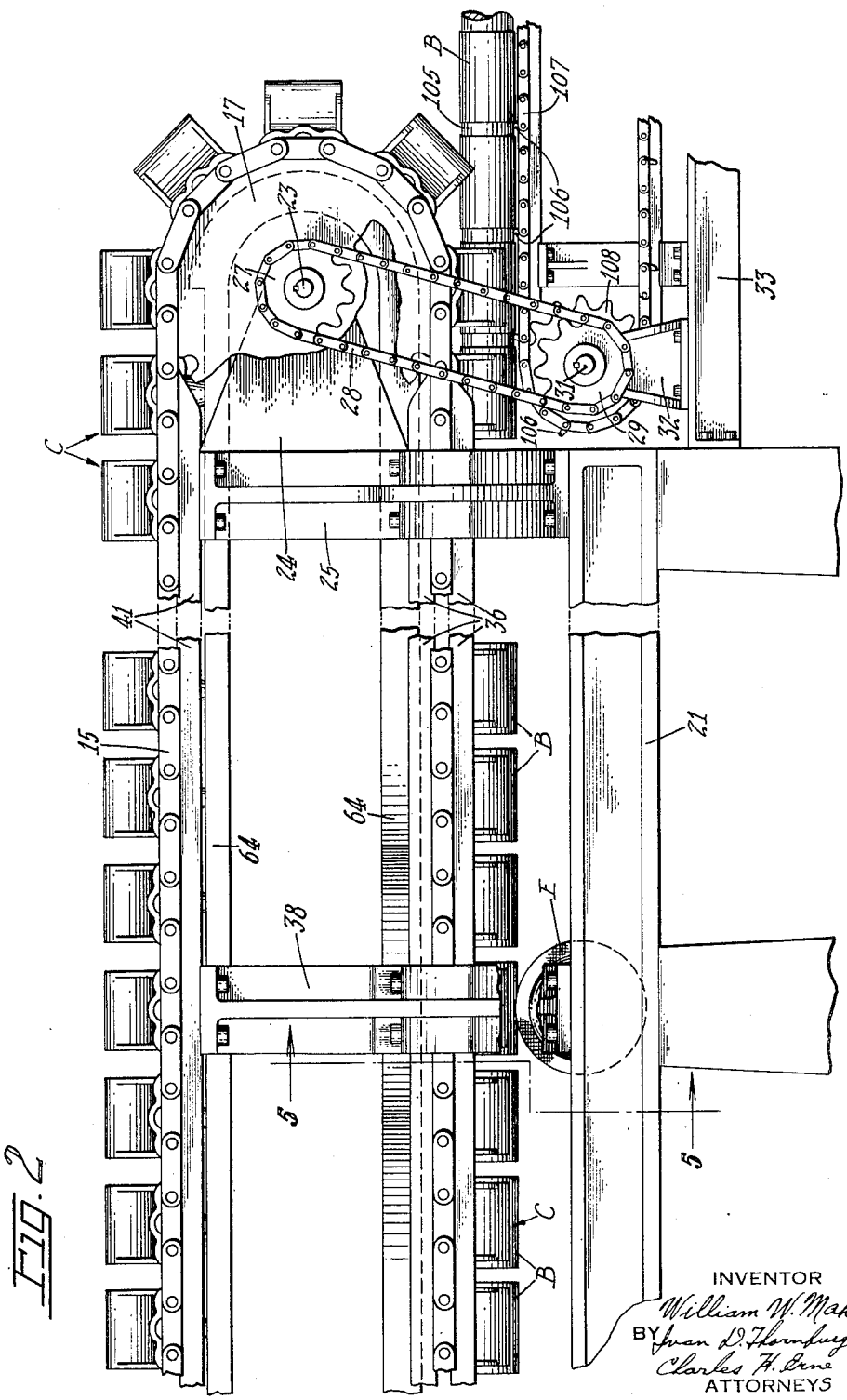

Thus as a gripper head C starts to move down around the idler sprockets 16, the jaw spreading roller 59 of the head engages in its heightened cam track 66 or 67 as the case may be, along side the roller 58. Thus both rollers 58, 59 are engaged in the tracks and as they traverse these tracks around the sprockets, they spread apart and thus open the jaws 46, 47 against the resistance of the spring 54. In this opened relation the jaws 46, 47 pass down over and clear of an incoming can body B on the feed-in mandrel 11 as best shown in Figs. 1 and 2.

When the open jaws reach the bottoms of the sprockets and are in parallelism with the can body and while the body is still advancing on the mandrel 11, the jaws close in on the body and grip it tightly between them. This closing of the jaws is brought about by the cam rollers 58, 59 traversing contracted portions of the cam 64 which are defined by inwardly extending side walls 75, 76 (Fig. 6) and a narrower separating wall 77 which walls are continuations of the side walls 72, 73 and separating wall 74. At the point of merging of the separating walls 74, 77 the wall 77 is reduced in height to clear the jaw spreading roller 59. This frees the roller 59 from guidance by the separating wall 77 as best shown in the lower portion of Fig. 3 and thus permits the spring 54 to keep the jaws tightly engaged against the body. However the roller 58 is guided in its track by the side wall 75 and the separating wall 77 and thus guides the can body along a straight line path of travel. The roller 59 is guided by the outer side wall 76 to lock the jaws closed against inadvertent opening.

During the travel of the gripped can body B along this straight line path, it is withdrawn from the mandrel 11 where it terminates adjacent the sprockets 16 and is passed over the soldering roll D with its side seam in engagement with the roll for the seam soldering operation. This soldering roll is a conventional soldering roll and is rotatably mounted in a solder bath 81 (Figs. 1 and 3) supported by the machine frame 21. The bath contains a supply of molten solder 82. The roll is rotated in the solder in any suitable manner, as for example by a sprocket and chain connection 83 with an end of the roll. The rotating roll carries the solder up onto the side seam of the moving can body in the usual manner.

Any excess solder applied to the side seam of the bodies is removed by the pair of spaced rotatable wiper wheels E hereinbefore mentioned. These wheels are located just beyond the solder bath 81 and are mounted in spaced relation on a rotatable cross shaft 85 (Fig. 5) journaled in a pair of bearing brackets 86 bolted to the machine frame 21. The shaft and the wiper wheels mounted thereon are rotated in any suitable manner, as for example by a bevel gear 87 having connection with a rotating part of the machine. The spacing of the wiper wheels E is such as to locate each wheel to one side of the straight line path of travel of the bodies, the two wheels being equi-distant from this path of travel by spacing equal to less than the distance between bodies fed to each wheel, as indicated by the spacing between successive pairs of followers in Fig. 6.

As a can body B approaches the wiping station it is deflected or diverted out of its straight line path of travel and continues along a parallel path of travel in alignment with a wiper wheel E. Alternate bodies are diverted to one side for engagement by one wheel while the in-between bodies are diverted toward the opposite side for engagement by the other wheel. Fig. 5 shows one body (at the left) in the act of being diverted toward the left for engagement with one wheel E and shows a preceding body (at the right) already in engagement with the opposite wheel.

In diverting a body B from its straight line path of travel into alignment with its wiping wheel E, the entire gripper head C is shifted laterally of the machine along its slide bars 44 by its head shifting roller 58 while maintaining its jaws closed and tightly gripping the body. This shifting of the head C is brought about by a section of the stationary cam 64 in which the cam tracks 66, 67 are spread apart as best shown in Fig. 6. In this widened portion of the cam the outer side walls 75, 76 merge into curved side walls 91, 92 which curve outwardly in opposite directions, then extend in parallelism for a distance adjacent the wiper wheels E, and then curve inwardly to their original straight line location.

The inner separating wall 77 merges into a continuing separating wall 93 which divides into two spaced inner walls 95, 96 which extend parallel with the outer curved side walls 91, 92. These inner walls 93, 95, 96 are of reduced height so that the jaw spreading rollers 59 are free and clear of them. Only the cam rollers 58 are guided between the outer side walls 91, 92 and the inner walls 93, 95, 96.

Hence as the gripper heads C approach this spread or widened portion of the cam 64, their cam rollers 58 follow the track 66 or 67 and are thus diverted to one side or the other in accordance with which track a roller is in. Thus since the heads on the conveyors 15 are reversed relative to adjacent heads as hereinbefore mentioned, alternate heads travel along the track 66 for carrying can bodies over one wiper wheel E, while the in-between heads travel along the track 67 for carrying can bodies over the other wiper wheel E.

In this manner the can bodies are staggered as hereinbefore mentioned and are positioned in separated and spaced relation for treatment by the wiper wheels E. Each can body is thus treated individually while separated and isolated from the others, and in the case above mentioned where the treatment is a solder wiping treatment, any solder pellets or other foreign matter that are thrown off by the rotating wheels are projected into space where there is no other body to receive such solder. Hence the bodies are kept free from contamination by solder pellets, flux or other foreign particles of matter.

The term "isolated" as used in this specification and the claims herein, refers to that position of a can body or like article, relative to other bodies in the same continuous procession, which is so removed spatially from those bodies that solder or other particles projected incident to a solder wiping or similar operation on the isolated body cannot contaminate or mar any of the other bodies in the procession.

Following this solder wiping operation the heads C are shifted back into their straight line path of travel, as their cam rollers 58 follow the inwardly curved portion of the outer side walls 91, 92 of the cam (Fig. 6). At this point in the cam the outer side walls 91, 92 merge into a pair of straight parallel side walls 97, 98 (Fig. 6) while the two inner separating walls 95, 96 merge into a single separating wall 99. These walls guide the cam rollers 58 and thus maintain the heads C in straight line alignment as the heads travel toward the discharge end of the machine.

At the discharge end of the machine the jaws 46, 47 of the heads C are spread apart to release their hold on the can bodies and to thus release the bodies for discharge. This spreading of the jaws is brought about by a spreading apart of both of the rollers 58, 59 under control of the cam 64. For this purpose the outer side walls 97, 98 of the cam merge into continuing outwardly curved side walls 101, 102 (Fig. 6) and the inner separating wall 99 merges into a thickened or wider separating wall 103. The separating wall 103 is also high enough to again engage and guide the cam roll 59.

Thus the two tracks 66, 67 in this portion of the cam spread apart in opposite directions and control the movement of both of the cam rollers 58, 59. This portion of the cam extends up adjacent the driving sprockets 17 at the discharge end of the machine and thus holds the jaws 46, 47 open as they pass up around these sprockets.

Just prior to the opening of the jaws 46, 47 of a head C, the can body B gripped by the head is telescoped over a stationary discharge mandrel or horn 105 as shown in Fig. 2. The body is carried along this horn until it is engaged by a feed dog 106 of an endless chain conveyor 107 disposed immediately below the horn. The conveyor operates over a sprocket 108 mounted on and continuously rotating with the main drive shaft 31. This conveyor propels the can body, as soon as it is released, to any suitable place of deposit.

Upon release of the body the head C with its jaws 46, 47 open, passes up over the horn, around the sprockets 17 and travels back toward the entrance end of the machine along the upper runs of the conveyors 15. Upon reaching the upper runs of the conveyors the cam rollers 58, 59 of the heads pass into the narrow portion of the cam 64 defined by the track side walls 68, 69 and the separating wall 71. Thus the jaws 46, 47 close under the force of their spring 54. The cam rollers 59 on the heads guide the heads and maintain them in straight line alignment as they travel along this portion of the cam back to the entrance end of the machine to repeat a can body gripping and carrying operation. This completes the cycle of operations of the machine.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. In a machine for soldering the side seams of can bodies and wiping them in individually isolated position, the combination of a conveyor moving along a predetermined path of travel, can body gripper heads slidably mounted on said conveyor for movement thereon transversely of said path of travel, each gripper head comprising a pair of cooperating gripper jaws movable relative to each other for gripping and carrying a can body with its side seam exposed past soldering and wiping stations, yieldable pressure applying means disposed between each pair of said jaws for yieldably urging the jaws toward each other for gripping a can body between them, a cam follower carried on each of said jaws, cam means simultaneously engaged by the followers of both jaws of each pair for separating the jaws against the action of said yieldable means to receive a can body and with the action of said yieldable means to grip the body between the jaws while the body side seam traverses an initial path, a second cam means engaged by one of said cam followers for sliding a said head with its yieldably gripped can body transversely of said conveyor to isolate said can body from all other bodies on said initial path, and means for wiping the solder along the side seam of said can body while thus isolated to prevent contamination of said other bodies by particles projected during the wiping operation.

2. In a machine for soldering the side seams of can bodies and wiping them in individually isolated position, the combination of a conveyor moving along a predetermined path of travel, a gripper head slidably mounted on said conveyor for movement transversely of said conveyor path, each gripper head comprising a pair of cooperating gripper jaws movable relative to each other for gripping and carrying a can body with its side seam exposed past soldering and wiping stations, a cam follower carried on one side of said jaws at one level and a cam follower carried on the other of said jaws at a different level, cam means having two deep tracks with which both of said cam followers are engageable for opening and closing said jaws and for maintaining the gripped can body in an initial straight line of travel for a portion of its advancement, a shallow cam track with which only one of said cam followers is engageable for sliding said gripper head transversely of said conveyor to laterally divert and isolate a gripped can body out of its initial straight line of travel and into a second path of travel, and means for wiping the solder along the side seam of each can body while on said second path of travel, the can body during the wiping operation being thus isolated from all other can bodies to prevent contamination of the bodies by particles projected during this operation.

3. In a machine for soldering the side seams of can bodies and wiping them in individual isolated position, the combination of an endless conveyor having a pair of spaced and parallel link chains moving along a predetermined path of travel, a pair of parallel transverse slide rods mounted on and between said parallel link chains, gripper heads each slidably mounted on each pair of slide rods and movable transversely of said conveyor for gripping and carrying can bodies with their side seams exposed for soldering and wiping operations, cam means engageable with and controlling the position of said gripper heads along said rods for passing the can bodies held thereby in an initial path of travel through a soldering operation, a second cam means engageable with and controlling the position of said gripper heads for sliding the heads on their supporting slide rods for moving the gripped can bodies individually out of alignment with and isolated from the initial path of travel of the can bodies, and means for wiping the solder along the side seam of each of said bodies while it is thus out of alignment with and isolated from all other can bodies advancing with said conveyor for preventing contamination of said other bodies by particles projected during the wiping operation.

4. In a machine for soldering the side seams of can bodies and wiping each body in isolated position while the bodies move in continuous procession, the combination of means for conveying can bodies, with molten solder applied to their side seams, along an initial substantially straight path, means for moving each can body laterally out of alignment with said straight path and through an isolated position relative to the bodies on said straight path, means for wiping the solder along the side seam of each can body while it moves through said isolated position and means for moving each wiped can body laterally out of alignment with the succeeding isolated body, so that each can body is wiped in an individually isolated position relative to all other moving can bodies in the continuous procession and any particles thrown off by and during the wiping operation cannot contaminate or mar other bodies in the procession.

WILLIAM W. MAHER.

REFERENCES CITED

The following references are of record in the file of this patent:

UNITED STATES PATENTS

| Number | Name | Date |
|---|---|---|
| 307,135 | Norton | Oct. 28, 1884 |
| 401,125 | Brown | Apr. 9, 1889 |
| 446,162 | Coleman | Feb. 10, 1891 |
| 518,375 | Ranney | Apr. 17, 1894 |
| 540,371 | Wagner | June 4, 1895 |
| 543,401 | Patterson | July 23, 1895 |
| 934,191 | Krummel | Sept. 14, 1909 |
| 976,540 | Bergner | Nov. 22, 1910 |
| 2,029,558 | Chalmers | Feb. 4, 1936 |
| 2,132,145 | Cameron | Oct. 4, 1938 |
| 2,135,579 | Johnson | Nov. 8, 1938 |
| 2,251,517 | Goebel | Aug. 5, 1941 |
| 2,266,792 | O'Neil | Dec. 23, 1941 |
| 2,275,415 | Boone | Mar. 10, 1942 |